United States Patent [19]

Siegmund

[11] Patent Number: 4,578,096
[45] Date of Patent: Mar. 25, 1986

[54] GRADIENT INDEX OPTICAL COMPONENTS

[75] Inventor: Walter P. Siegmund, Woodstock, Conn.

[73] Assignee: Warner-Lambert Technologies, Inc., Tex.

[21] Appl. No.: 177,549

[22] Filed: Aug. 13, 1980

[51] Int. Cl.$^4$ .................................. G02B 6/18
[52] U.S. Cl. .................. 65/3.11; 350/96.31; 350/413
[58] Field of Search .............. 350/96.30, 96.31, 413; 65/3.11, 3.13, 3.14

[56] References Cited

U.S. PATENT DOCUMENTS

| | | | |
|---|---|---|---|
| 2,992,517 | 7/1961 | Hicks, Jr. ................................. | 49/79 |
| 3,791,806 | 2/1974 | Koizumi et al. ....................... | 65/3.13 |
| 3,843,228 | 10/1974 | Yoshiyagawa et al. ........... | 350/96.31 |
| 3,941,474 | 3/1976 | Kitano et al. ..................... | 350/96.31 |
| 4,053,205 | 10/1977 | Miller ............................ | 350/96.31 X |
| 4,106,850 | 8/1978 | Marcatili ......................... | 350/96.31 |
| 4,277,271 | 7/1981 | Krohn ............................ | 350/96.31 X |

FOREIGN PATENT DOCUMENTS

| | | | |
|---|---|---|---|
| 23223 | 6/1972 | Japan ................................ | 350/96.31 |
| 88736 | 8/1978 | Japan ................................ | 65/3.13 |

*Primary Examiner*—John Lee
*Attorney, Agent, or Firm*—Alan H. Spencer

[57] ABSTRACT

An optical component having a gradient refractive index produced by multiple windings of a glass fiber over a glass mandrel. The fiber is provided with a refractive index gradation which varies from an approximate match with the mandrel to selected lower values along its length thereby causing refractive index in the depth of windings to vary accordingly. Fusion and drawing of the mandrel and windings provide a rod (or fiber) of solid cross-section having a radial index gradient of predetermined profile.

10 Claims, 4 Drawing Figures

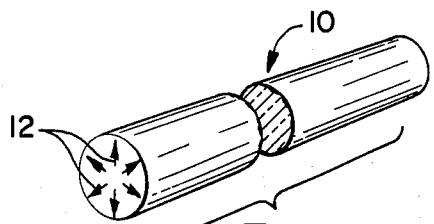
FIG. 1
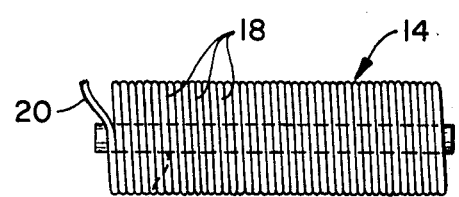
FIG. 2
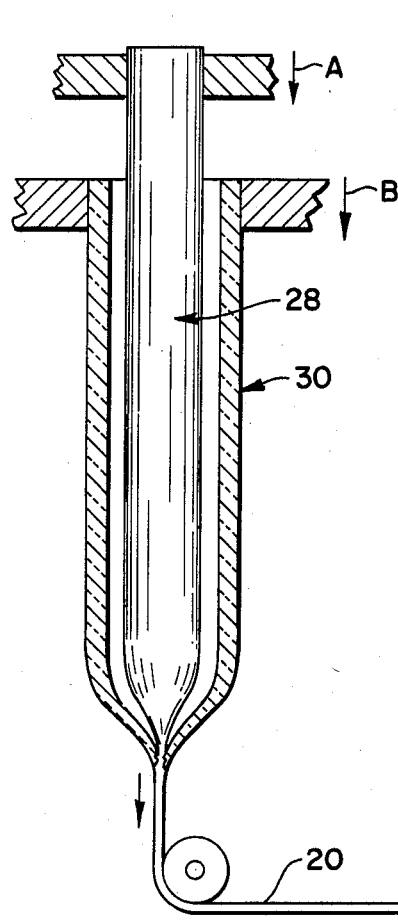
FIG. 4
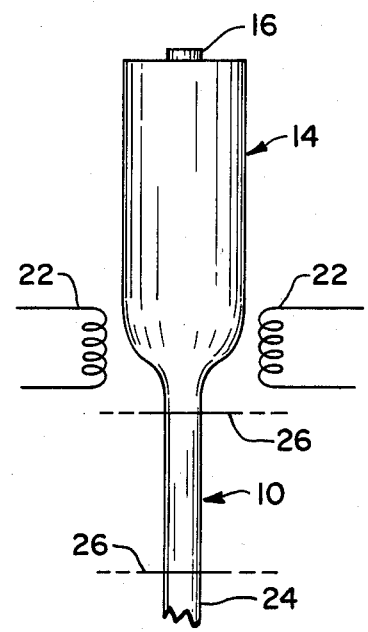
FIG. 3
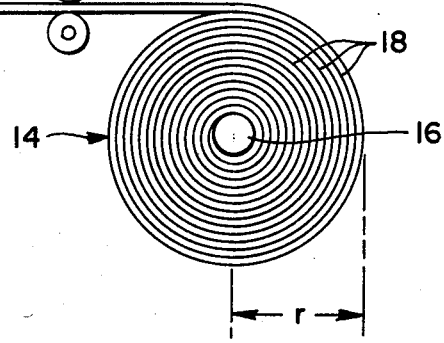

GRADIENT INDEX OPTICAL COMPONENTS

BACKGROUND OF THE INVENTION

1. Field of the Invention

This invention relates to optical rod, lens and fiber components having gradient refractive indices and has particular reference to improvements in method of making same.

2. Discussion of the Prior Art

Graded refractive index optical components such as micro lenses and optical fibers are presently manufactured by interdiffusion or chemical deposit processes, both requiring lengthy and costly treatment in special ovens and/or preparations of pastes, powders, liquids or gases. U.S. Pat. No. 3,843,228 is exemplary of one such prior art process and U.S. Pat. Nos. 3,791,806 and 3,941,474 exemplify others.

In view of the foregoing, an object of this invention is to minimize the cost of graded refractive index articles by simplification of processing and provision for efficient mass production of graded rod or fiber.

More particularly, there is the objective of avoiding the need for lengthy interdiffusion or chemical treatment in the manufacture of graded lens or fiber components.

Still another object is to provide means and method for accurate control of graded refractive index profile in optical rod, fiber or lenses.

Other objects and advantages of the invention will become apparent from the following description.

SUMMARY OF THE INVENTION

According to the invention, optical rod or fiber components are formed by winding a glass fiber in multiple layers over a glass mandrel. The fiber is provided with a predetermined longitudinal variation of refractive index from an approximate match with the mandrel at a first layer of winding to a substantially lower index at a final layer of winding, whereby refractive index through the depth of total windings will change accordingly. Fusion and drawing of the wound assembly provides a rod (or fiber) of solid cross-section having a radial refractive index profile similar to that of the fiber windings but blended in outward transition by ionic diffusion.

Details of the invention will become more readily apparent from the following description when taken in conjunction with the accompanying drawings.

IN THE DRAWINGS

FIG. 1 is an illustration, in perspective, of a gradient refractive index component of a type resulting from the practice of this invention;

FIG. 2 is a side view of a preform of optical elements from which components such as that of FIG. 1 may be produced;

FIG. 3 is a diagrammatic illustration of a method of working the preform of FIG. 2; and FIG. 4 diagrammatically illustrates a preferred system for fabricating the above preform.

DESCRIPTION OF THE PREFERRED EMBODIMENTS

FIG. 1 depicts an optical component 10 having a refractive index gradient extending radially outwardly as illustrated with arrows 12. The refractive index, being greatest in the central portion of component 10, renders the piece useful as a needle-like image-conducting lens (i.e. with opposite ends polished) or available for division into shorter lengths having utility as objectives for fiberscopes and the like. Pieces in such small diameters as 1 mm, for example, can relay distinct images of objects placed at or near their entrance ends. Also, when cut to proper lengths, components 10 can be bundled together and used to transport upright images in document-copying systems. Smaller diameter components provide optical fibers.

Rod lenses are typically 0.5 to 5 mm in diameter and gradient fibers usually range from 0.05 to 0.15 mm in diameter. Other sizes may, of course, be provided within the scope of the invention.

According to the invention, component 10 is produced from a preform 14 comprised of a core 16 of high refractive index glass over which multiple convolutions 18 of a thin glass-coated glass fiber 20 are formed, preferably in "level-winding" fashion. Building from a core 16 diameter of only a few millimeters to 10–30 mm or more is contemplated with a fiber 20 diameter of from 25 to 50 microns. This will provide adequate fiber 20 flexibility for tight winding of the convolutions 18.

The effective (i.e. average) cross-sectional refractive index of fiber 20 is reduced gradually, or in step-wise fashion, over its length preferably from a match with the glass of core 16 (e.g. 1.8) to a substantially lower value at the periphery of preform 14 (e.g. 1.5).

Preform 14 is preferably heated to fuse the core and windings into a solid mass and the mass is heat treated to diffuse the glasses within the fibers and adjacent portions of the core for uniform index gradient in the preform. The small diameter of fiber 20 permits adequate ionic diffusion within its components over a relatively short period of time (e.g. a few hours) at a temperature near deformation temperature.

The preform is next zonally heated (e.g. with heaters 22,) and drawn to the cross-sectional size desired of component 10 or others to be produced. Thereafter, the component(s) is cut from the draw 24 as illustrated with lines 26.

The refractive index of fiber 20 is gradually (or stepwise) reduced during the above winding operation by differentially feeding the core 28 and cladding 30 stock which is used to produce fiber 20 (FIG. 4). The core rod 28 and cladding tube 30 are fed into heating zone at particular rates according to the index profile desired in preform 14. This profile may, for example, be a parabolic distribution with radius r (FIG. 4) of the final preform 14.

With rod 28 comprised of a flint glass having a refractive index of from 1.6 to 1.8 and tube 30 comprising a soda-lime glass of approximately 1.5 index, adjustment of feed of these components into heating zone can begin with a draw of substantially only the high index rod glass (as indicated by arrow A) and a following of progressive or step-wise inclusion of more and more of the tube glass by feeding as indicated with arrow B to the extent that the draw ends with substantially only the glass of the low refractive index tube. While differential feeding and drawing of rod and tube components are illustrated, it should be understood that similar results can be obtained with extrusion of fiber core and cladding materials under differential pressures. A suitable extrusion process is illustrated in U.S. Pat. No. 2,992,517.

It should also be understood that the above-mentioned treatment of preform 14 for ionic diffusion within its components (i.e. for blending or smoothening of the index steps) may be carried out simultaneously with the operation of drawing to reduced diameter. Furthermore, the mention herein of the use of flint and soda-lime glasses for fiber 20 core and cladding parts is to be taken as illustrative only. While these glasses are known to satisfactorily ionically diffuse, combinations of other glasses having similar diffusing properties may be used. Additionally, core 16 itself may be provided with a gradient refractive index prior to the addition of windings 18 in cases where a radial gradation of refractive index in component 10 is required to begin near the center of the component. This can be accomplished by using a preform such as 14 for producing core pieces 16. For example, a draw 24 (FIG. 3) brought to a suitable core 16 diameter of only a few millimeters would provide a suitably radially graded core piece.

Other modifications and adaptations of precise forms of the invention described above may be made to meet particular requirements. This disclosure is intended to exemplify the invention without delimiting its scope and all modifications which incorporate the novel concept disclosed are to be construed as coming within the scope of the appended claims or range of equivalency to which they are entitled.

I claim:

1. The method of making a gradient refractive index optical component comprising the steps of:
    drawing a thin and flexible glass fiber having a longitudinally variable index of refraction;
    winding said fiber over a glass core member in multiple layer fashion;
    fusing said wound fiber and core member together as a solid mass;
    drawing the mass to the reduced cross-sectional size desired of said optical component; and
    transaxially cutting said component from the draw.

2. The method according to claim 1 wherein said fiber comprises a draw of central and cladding glasses, said glasses being differentially fed into said draw.

3. The method according to claim 2 wherein said central glass is of a substantially higher refractive index than said cladding glass.

4. The method according to claim 3 wherein one end of said fiber is comprised of a greater cross-sectional area of said central fiber glass than the opposite end of said fiber whereby the effective cross-sectional refractive index of said fiber is variable from one end to the other.

5. The method according to claim 4 wherein the refractive index of said fiber adjacent said one end is higher than the refractive index adjacent said opposite end.

6. The method according to claim 5 wherein the refractive index profile through said multiple layer winding of fiber is of decreasing value from said core member radially outwardly through said winding.

7. The method according to claim 5 wherein said core member is of a refractive index approximating that of said one end of said wound fiber.

8. The method according to claim 1 wherein said variable refractive index of said fiber is gradual over its length.

9. The method according to claim 1 wherein said variable refractive index of said fiber is graded in stepwise fashion over its length.

10. The method according to claim 1 wherein said glasses of said fiber and core member are ionically diffused at a stage between completion of said winding and said step of transaxially cutting.

* * * * *